(No Model.)

P. SHERRER & J. SCHMIDT.
CASK PITCHING APPARATUS.

No. 574,827. Patented Jan. 5, 1897.

WITNESSES
J. C. Hipp
J. B. Bloesinger.

INVENTORS
Philip Sherrer
Joseph Schmidt
BY Bd. F. Eibler
Atty.

ADD # UNITED STATES PATENT OFFICE.

PHILIP SHERRER AND JOSEPH SCHMIDT, OF CLEVELAND, OHIO.

CASK-PITCHING APPARATUS.

SPECIFICATION forming part of Letters Patent No. 574,827, dated January 5, 1897.

Application filed August 30, 1895. Serial No. 561,034. (No model.)

*To all whom it may concern:*

Be it known that we, PHILIP SHERRER and JOSEPH SCHMIDT, citizens of the United States, and residents of Cleveland, in the county of Cuyahoga and State of Ohio, have invented a certain new and Improved Cask-Pitching Apparatus; and we do hereby declare that the following is a full, true, and exact description thereof.

Our invention relates to a pitching apparatus for lager-beer casks; and the object of our improvement is to provide means for effecting an efficient and complete disposal of the vapors (and condensation thereof) which rise within the apparatus from the pitching material, which is used in a highly-heated state for the purpose of coating the interior walls of beer-casks with an adherent film. "Brewer's pitch" (the material used) chiefly consists of rosin or colophony, which is the resinous constituent of the crude turpentine or oleoresin, which by distillation is separated into the highly-volatile oil-spirit of turpentine and rosin. The common or commercial rosin still contains a certain percentage of turpentine, and the former when and while being heated will set free the latter in the form of vapors. Such vapors should be withdrawn from the vessel containing the molten rosin, and most effectually, so that no part thereof can or may reach the casks or packages to be pitched, for mere traces of turpentine impair the quality of the liquid to be stored or carried within said casks.

With the object of successfully removing these vapors and also the condensation thereof we provide a contrivance in connection with the above-mentioned apparatus for escape of said vapors and for collection of any and all condensation thereof.

That our invention may be fully understood and seen reference will be had to the following specification and the accompanying drawings, in which—

Figure 1:
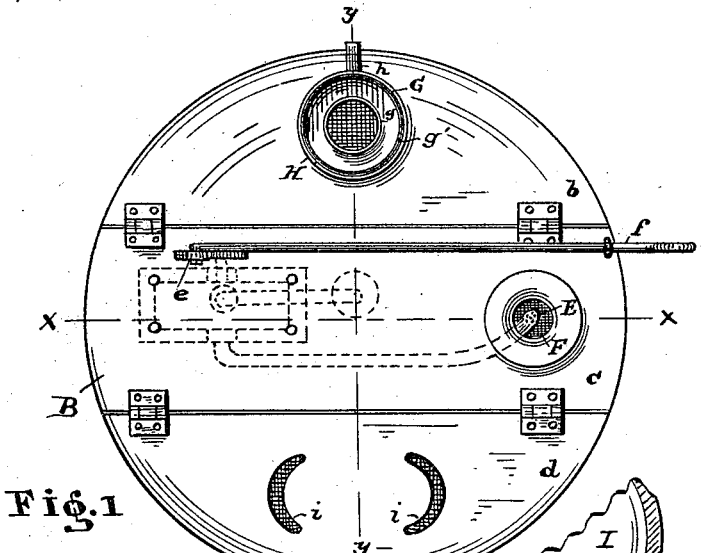
Figure 2:
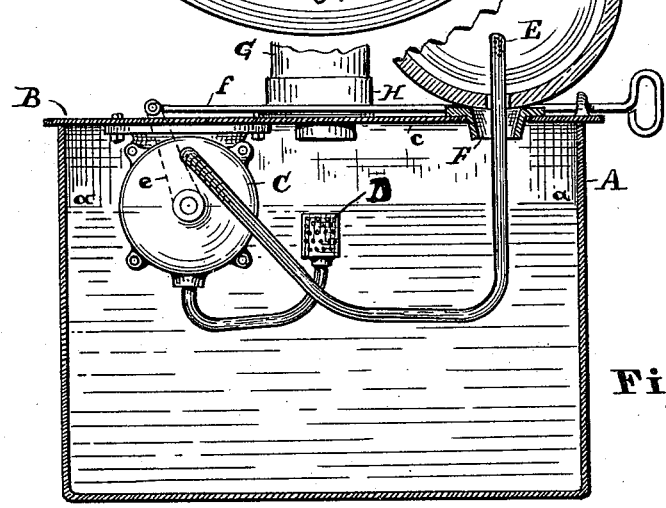
Figure 3:
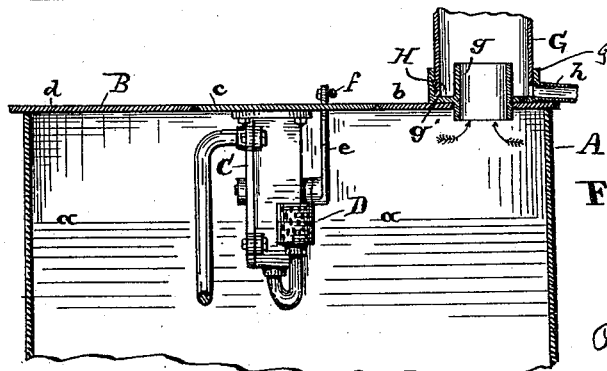

Figure 1 represents a plan view of said apparatus. Fig. 2 is a partial vertical section of the same on line $x\,x$. (See Fig. 1.) Fig. 3 is another vertical section on line $y\,y$.

Like letters of reference denote like parts in the drawings and specification.

Preferably we embody our improvement in an apparatus constructed and equipped substantially as shown, in which A represents the kettle, B the cover thereof. C is an oscillating piston-pump, D the strainer therefor, and E a spray-nozzle arranged in connection with the discharge side of said pump.

The kettle A is shown as filled with molten material up to a level, as indicated by the line $a\,a$.

The material is converted into the molten and necessary highly-heated state by subjecting the kettle to any suitable source of heat or fire.

Usually the cover B consists of the hinged parts $b$, $c$, and $d$, as shown in Fig. 1.

Fastened to and depending from the center part $c$ is the pump C, of which a more full description is given in the Patent No. 529,310, dated November 13, 1894, for a cask-pitching apparatus.

The operating-lever $e$ of said pump extends through said cover B for connection with the shifter $f$. (See Figs. 1 and 2.)

In communication with the inlet side of the pump C there is arranged the strainer D. Preferably the position of said strainer is such as to receive its supply from the upper strata of the molten pitch.

Leading from the discharge side of said pump, in a course substantially as indicated, is the pipe or conduit of the spray-nozzle E, and the said nozzle extends sufficiently from out the opening F of the cover B to assure a uniform coating of the casks when and while the latter are placed over the opening F, as indicated in Fig. 2.

A few repeated strokes of the shifter suffice for ejecting the necessary quantity of pitch into the cask. At every stroke a certain quantity of pitch enters the pump by way through the strainer. The latter is placed in the highest possible position which is consistent with a proper operation of said pump, for in the higher strata the strainer is less liable of becoming clogged, but attention should be given that said upper strata cannot become impregnated by condensation of the vapors of oleoturpentine which prevail within said kettle. To accomplish this, we arrange a flue G with drip-pan H in connection with the cover of said kettle. We prefer to construct said pan or collector in the form of a thimble $g$, having a flanged annular rim $g'$, with a drain-pipe *h* leading from one side thereof. The flue is set inside said flanged rim of said thimble and may independently be carried to a suitable height, or it may connect with a chimney, if convenient.

In the cover B, preferably opposite the above-mentioned flue, there are perforations *i*, as seen in Fig. 1. Air can thus enter in under said cover to cause a more rapid escape of the vapor by way through said flue.

From the foregoing it can readily be seen or understood that the vapors may not only effectually escape, but also that protection is afforded against condensation from said vapors.

Any condensation formed or caused on the inner surface of the flue will and can only run into the pan at the foot thereof, from where it is drained in the manner as indicated. By adapting for the above-named feature a construction as shown we are enabled to readily equip any or all kinds of pitch-kettles with the above-named improvement, which is indispensable with kettles having a spraying device operatively connected with the interior supply mechanism.

What we claim, and desire to secure by Letters Patent, is—

The kettle, provided with a hinged cover *b*, combined with the thimble *g*, drip-pan H, and drain-pipe *h*, all made in a single piece and secured to said door, and the flue G, which has its lower end to fit in said drip-pan, and which is provided with an opening through its edge corresponding to the pipe *h*, substantially as shown.

In testimony whereof we hereunto set our hands in presence of two witnesses.

PHILIP SHERRER.
JOSEPH SCHMIDT.

Witnesses:
BERNHARD F. EIBLER,
PHILIP VOELKLE.